Nov. 6, 1928.
A. E. WILSON
1,690,658
FILLING OF JOINT BOXES FOR ELECTRIC CABLES
Original Filed June 18, 1925
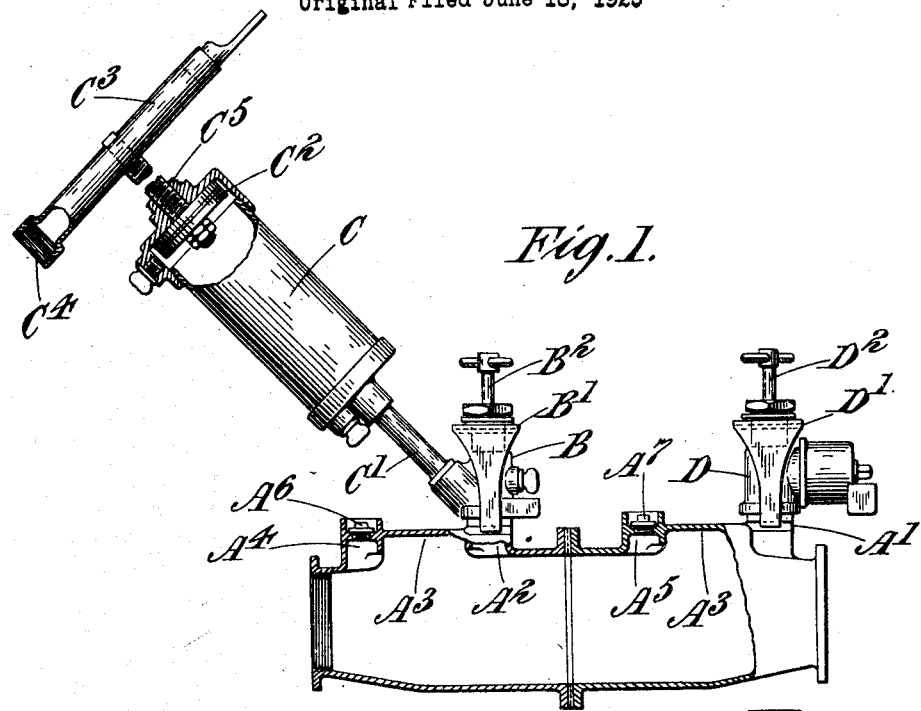
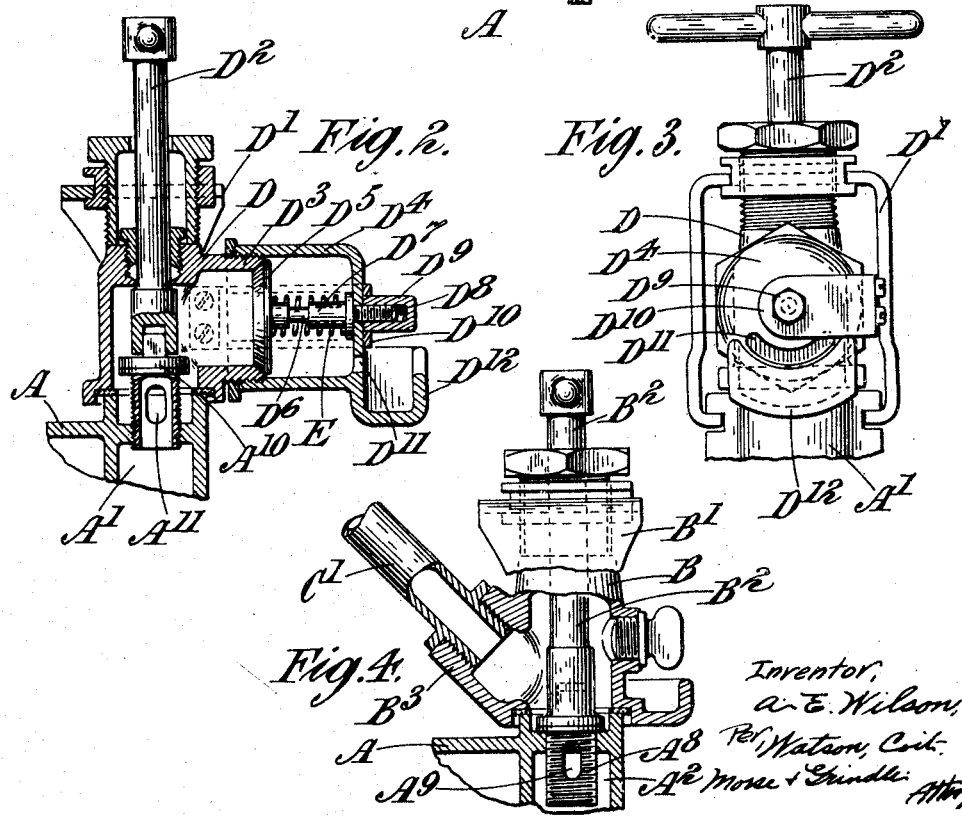
Inventor,
a. E. Wilson,
Per Watson, Coit.
& Morse & Grindle
Attny.

Patented Nov. 6, 1928.

1,690,658

UNITED STATES PATENT OFFICE.

ALFRED EDGAR WILSON, OF BROMLEY, ENGLAND.

FILLING OF JOINT BOXES FOR ELECTRIC CABLES.

Original application filed June 18, 1925, Serial No. 38,116, and in Great Britain July 26, 1924. Divided and this application filed May 7, 1926. Serial No. 107,526.

This application is divisional from the present applicant's application for Letters Patent of the United States of America Serial No. 38,116, filed June 18, 1925. The invention relates to the filling of joint boxes for electric cables and has particular reference to joint boxes for super-tension cables.

It is important that the joint boxes for such cables shall be free from vacuous spaces or spaces containing air at less than atmospheric pressure and attempts to secure such a result have hitherto not been entirely successful.

Boxes made with domes to entrap air have been filled with hot compound and spaces left after the contraction of the compound on cooling have been filled with a further supply of compound but such a method involves the expenditure of considerable time and care and it is practically impossible to avoid the presence of small spaces or "cooling cones" which, when the box and its contents are finally cool, contain air at less than atmospheric pressure.

The method according to the present invention consists in filling the box with compound under pressure in such a way that when the box and its contained joints are at earth or atmospheric temperature, there are no vacuous spaces or spaces at less than atmospheric pressure, all spaces not filled with the compound preferably being at a pressure greater than that of the atmosphere.

The compound used for filling is preferably of such a nature that it can be forced in under pressure whilst cold. For example, it may be a resin oil. It is not necessary that the entire process of filling the box shall be carried out under pressure and preferably the box is first partially filled with heated compound by pouring the compound in and then the filling operation is completed by forcing in cold fluid compound under pressure. The holes or openings through which the compound enters and leaves the box are arranged in such a way that they can be closed or sealed whilst the compound is under pressure.

The improved method may be carried out in various ways and by any suitable apparatus but preferably detachable fittings are provided for attachment to holes or openings in the box. These holes or openings may be such as are usually provided in joint boxes one of them being the entrance hole for the compound and the other the vent hole through which the compound may extrude when the box has been filled.

Each detachable fitting preferably comprises a chamber open at the bottom and arranged so that it can be clamped down pressure-tight around the hole, say, by a yoke or stirrup. The holes are provided with screw plugs which are hollow and formed with lateral openings so that when they are partly unscrewed, the compound can pass through them from or into the chamber. Each fitting is provided with means, such for instance as a box spanner or key, whereby the plugs can be screwed down to close the openings and thus seal the box whilst the compound is under pressure. The spindles of the spanners or keys pass out at the tops of the chambers through suitable glands.

The detachable fitting for the entrance hole is adapted to receive the nozzle of a pump which, for instance, may screw into an opening at the side of the chamber. Alternatively the chamber itself may form part of the base of the pump.

The fitting for the vent or exit hole is provided with a relief valve which closes a hole in the side of the chamber and is normally kept on its seating by a weight or spring whose pressure can be regulated by means of a screw.

A convenient method of carrying out the invention with the apparatus described is as follows:—The box with the jointed cables is first filled as full as may be desired with the compound previously heated so that it flows very easily. This may be introduced in any usual way through the entrance hole at one end of the joint box, the plug for that hole and the corresponding plug for the vent hole being either removed or loosened. After this preliminary filling and preferably after the compound has cooled, the plugs are inserted loosely and the two fittings are placed in position and clamped down by their yokes or stirrups so as to make a pressure-tight joint over the openings and plugs. The relief valve of the fitting over the vent opening is adjusted so that it will open when the desired pressure is attained and cold but still comparatively fluid compound is forced by the pump into the fitting over the entrance hole, through the loose plug in that hole and into the box. This is continued until the compound is forced out through the vent hole plug and the chamber of its fitting and through the relief valve. The extrusion of the compound through the relief valve is an indication that the box has been filled with the compound under the desired pressure and the spanners or keys are then operated, whilst the pressure is still on, to close the two plugs thus retaining pressure within the box. After this the yokes or stirrups can be removed and the fittings detached leaving the joint box finished.

The improved method may be applied to any suitable form of joint box but is particularly suited for application to any known form of metal joint box having domes formed in its upper portion and by such application it is possible to ensure that any air entrapped in the dome shall be under a pressure which, when the box is at earth or atmospheric temperature, is equal to or greater than atmospheric pressure.

In the accompanying drawings,

Figure 1 is an elevation partly in section showing one construction of joint box and detachable fittings suitable for use in carrying out the method according to this invention, Figure 2 is a central vertical section through the fitting for the outlet or vent hole, Figure 3 is an elevation of the same fitting viewed at right angles to Figure 1, and Figure 4 is an elevation partly in section of the inlet fitting.

Figures 2, 3 and 4 are drawn to a larger scale than Figure 1.

With reference first to Figure 1 A is a metal joint box having an inlet or filling hole at $A^2$ and a vent at $A^1$ and also provided with air domes $A^3$ and openings $A^4$ and $A^5$ which can be closed by screw plugs and washers $A^6$ $A^7$.

To the entrance or filling hole $A^2$ a detachable fitting B can be clamped by means of a yoke $B^1$. Through a gland in this fitting passes a rod $B^2$ having at its lower end a box spanner or key which engages with a squared end on the screwed plug $A^8$ (Figure 4). This plug is hollow and provided with slots $A^9$ so positioned that when the plug is partially unscrewed, communication is established between the interior of the detachable fitting B and the box A. The fitting B is provided with a screwed opening $B^3$ to take the nozzle $C^1$ of a pump C. In Figure 1 this pump C is shown as provided with a screw-operated piston $C^2$ worked by a handle $C^3$ which is hollow and has one end threaded as at $C^4$ so that when the pump is not in use the handle can be slipped over the screwed piston rod to protect it, the threaded portion $C^4$ engaging with a screwed boss $C^5$ on the cover.

The vent hole $A^1$ is provided with a detachable fitting D shown in more detail in Figures 2 and 3. This fitting can be clamped to the vent hole $A^1$ by means of a yoke $D^1$ and has a rod $D^2$ passing through a gland and provided at its lower end with a spanner or key for a screwed plug $A^{10}$ fitting into the vent hole $A^1$.

This screwed plug $A^{10}$ is hollow and provided with slots as at $A^{11}$ so that when the plug is raised by turning the rod $D^2$ as shown in Figure 2, there is free communication between the box A and the interior of the fitting D. At the side of the fitting D is a screwed boss $D^3$ fitted with a cap $D^4$ containing a valve $D^5$ which fits on a seating at the end of the hollow boss $D^3$. The stem $D^6$ of the valve $D^5$ passes into a guide sleeve $D^7$ having a screwed stem $D^8$ and a coiled spring E is placed between the valve $D^5$ and a collar on the guide sleeve $D^7$. The valve $D^5$ functions as a relief valve and the pressure at which it works can be adjusted by turning the screwed stem $D^8$. After adjustment the stem $D^8$ is covered by a cap $D^9$ and this cap is kept in place by means of a plate $D^{10}$ (Figure 3) so that the adjustment of the valve cannot be tampered with. The cap $D^4$ is provided with a small outlet hole $D^{11}$ (Figure 3) leading to a tray or catcher $D^{12}$.

In operation the box containing the jointed cables is first preferably filled as full as may be desired with the compound previously heated so that it flows very easily. This may be done in any usual way through the entrance hole $A^2$ before the fitting B is attached to it, some or all of the plugs $A^6$ $A^7$ and $A^{10}$ being loosened or removed. After this preliminary filling and preferably after the compound has cooled, the fittings B and D are attached to the inlet and vent holes respectively and clamped down so as to make pressure-tight joints, the plugs $A^8$ and $A^{10}$ being raised. The relief valve $D^5$ is adjusted so that it will open when the desired pressure is attained and cool but still comparatively fluid compound is forced by the pump C into the fitting B through the plug $A^8$ into the box A. At any convenient stage in this process the plugs $A^6$ and $A^7$ are closed and the filling is continued until the compound is forced out through the vent hole plug $A^{10}$ and the fitting D through the relief valve chamber or cap $D^4$. The extrusion of the compound through the hole $D^{11}$ into the tray $D^{12}$ is an indication that the box has been filled with the compound under the desired pressure and the rods $D^2$ and $B^2$ are then operated whilst the pressure is still on, to close the plugs $A^{10}$ and $A^8$, thus retaining the pressure within the box. The yokes or stirrups $D^1$ and $B^1$ can then be removed and the fittings detached, leaving the joint box finished. When, as in the construction illustrated and described by way of example, the joint box is furnished with air domes $A^3$ it will be obvious that any air entrapped in the domes during the final filling process may be left at a predetermined pressure which, when the box is at earth or atmospheric temperature, is equal to or greater than the atmospheric pressure.

What I claim as my invention and desire to secure by Letters Patent is:—

1. A method of filling a joint box for electric cables consisting in filling the box through an entrance hole with fluid compound under pressure until said compound extrudes through a variable relief vent in the box and then closing the entrance hole and the vent hole to seal the box while the compound is still under pressure.

2. A method of filling a joint box for electric cables consisting in filling the box through an entrance hole with fluid compound under pressure until said compound extrudes through a relief vent in the box and then closing the entrance hole and the vent hole to seal the box while the compound is still under pressure.

3. A method of filling a joint box for electric cables in which the box, after being partially filled with heated compound and allowed to cool, is then completely filled by forcing in cold fluid compound under pressure through an entrance hole until said cold compound extrudes through a variable relief vent in the box, and then closing the entrance hole and the vent to completely seal the box while the compound is still under pressure.

In testimony whereof I have signed my name to this specification.

ALFRED EDGAR WILSON.